US 9,983,407 B2

(12) United States Patent
Ng-Thow-Hing et al.

(10) Patent No.: US 9,983,407 B2
(45) Date of Patent: May 29, 2018

(54) MANAGING POINTS OF INTEREST

(71) Applicant: Honda Motor Co., Ltd., Minato-ku, Tokyo (JP)

(72) Inventors: Victor Ng-Thow-Hing, Sunnyvale, CA (US); Cuong Tran, Hanoi (VN); Karlin Bark, Menlo Park, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 14/851,878

(22) Filed: Sep. 11, 2015

(65) Prior Publication Data
US 2017/0076415 A1    Mar. 16, 2017

(51) Int. Cl.
*G02B 27/01* (2006.01)
*G06F 3/01* (2006.01)

(52) U.S. Cl.
CPC ......... *G02B 27/0101* (2013.01); *G02B 27/01* (2013.01); *G06F 3/017* (2013.01); *G02B 2027/014* (2013.01); *G02B 2027/0138* (2013.01); *G02B 2027/0187* (2013.01)

(58) Field of Classification Search
CPC ............. G06T 1/0007; G02B 27/0101; G02B 2027/0138; G02B 2027/014; G02B 2027/0141; G06F 3/017
See application file for complete search history.

(56) References Cited

U.S. PATENT DOCUMENTS

| | | | |
|---|---|---|---|
| 6,930,715 | B1 | 8/2005 | Mower |
| 8,200,246 | B2 | 6/2012 | Khosravy et al. |
| 8,379,134 | B2 | 2/2013 | Foster |
| 8,467,991 | B2 | 6/2013 | Khosravy et al. |
| 8,615,257 | B2 | 12/2013 | Khosravy et al. |
| 8,700,301 | B2 | 4/2014 | Khosravy et al. |
| 8,700,302 | B2 | 4/2014 | Khosravy et al. |
| 8,760,432 | B2 | 6/2014 | Jira et al. |
| 8,769,442 | B2 | 7/2014 | Khosravy et al. |
| 8,818,716 | B1 | 8/2014 | El Dokor et al. |
| 2006/0044119 | A1* | 3/2006 | Egelhaaf .................. G08B 5/36 340/425.5 |
| 2007/0040928 | A1 | 2/2007 | Jung et al. |
| 2007/0052856 | A1 | 3/2007 | Jung et al. |
| 2007/0109411 | A1 | 5/2007 | Jung et al. |
| 2007/0274563 | A1 | 11/2007 | Jung et al. |
| 2008/0043108 | A1 | 2/2008 | Jung et al. |
| 2009/0315766 | A1 | 12/2009 | Khosravy et al. |
| 2009/0315775 | A1 | 12/2009 | Khosravy et al. |
| 2009/0315776 | A1 | 12/2009 | Khosravy et al. |
| 2009/0319166 | A1 | 12/2009 | Khosravy et al. |
| 2009/0319177 | A1 | 12/2009 | Khosravy et al. |

(Continued)

*Primary Examiner* — Towfiq Elahi
(74) *Attorney, Agent, or Firm* — Arent Fox LLP

(57) ABSTRACT

One or more embodiments of techniques or systems for managing locations are provided herein. According to one embodiment, a system includes a heads up display (HUD) that receives an image associated with a location. The image may be captured by a camera of a vehicle. The system also includes a sensor component that detects a physical gesture performed by a user. Furthermore, the system includes an action component that correlates the physical gesture with an action associated with the image. The action component also performs the action. The action is one of saving the image to a storage component or deleting the image.

9 Claims, 7 Drawing Sheets

(56) References Cited

U.S. PATENT DOCUMENTS

| | | |
|---|---|---|
| 2009/0319178 A1 | 12/2009 | Khosravy et al. |
| 2009/0319348 A1 | 12/2009 | Khosravy et al. |
| 2010/0008255 A1 | 1/2010 | Khosravy et al. |
| 2010/0009662 A1 | 1/2010 | Khosravy et al. |
| 2010/0274480 A1 | 10/2010 | McCall et al. |
| 2010/0332324 A1 | 12/2010 | Khosravy et al. |
| 2011/0006977 A1 | 1/2011 | Khosravy et al. |
| 2011/0199479 A1 | 8/2011 | Waldman |
| 2013/0076615 A1 | 3/2013 | Iao |
| 2013/0226990 A1* | 8/2013 | Yamazaki ........... G06F 17/3087 709/202 |
| 2014/0176348 A1* | 6/2014 | Acker, Jr. .............. G08G 1/144 340/932.2 |
| 2014/0256357 A1 | 9/2014 | Wang et al. |
| 2014/0257747 A1 | 9/2014 | Repenning et al. |
| 2014/0277936 A1 | 9/2014 | El Dokor et al. |
| 2015/0199019 A1* | 7/2015 | Steers .................... G06F 3/017 348/148 |

\* cited by examiner

MANAGING POINTS OF INTEREST

BACKGROUND

While driving a vehicle, a user may become curious about a location, such as a point of interest (POI) such as a new business, restaurant, or popular place, but not have time to stop, look, or process what the POI is. For example, while passing a POI, such as a new restaurant, the user may wish to remember the look and location of the restaurant. Currently, a user may use a mobile device to capture the image of the restaurant while also operating the vehicle, which may endanger the user, other occupants, individuals in the vicinity of the vehicle, the vehicle itself and/or other personal property.

Even if the user succeeds, the captured images do not provide contextual information beyond the pixels of the scene. Moreover, while the user may be able to snap a photo with a mobile device, the user does not have the time to manage the photos taken. Accordingly, while driving provides an opportunity to explore new areas or learn about a neighborhood, it may be dangerous or ineffective to attempt to save location-based information about a POI.

BRIEF DESCRIPTION

This brief description is provided to introduce a selection of concepts in a simplified form that are described below in the detailed description. This brief description is not intended to be an extensive overview of the claimed subject matter, identify key factors, or essential features of the claimed subject matter, nor is it intended to be used to limit the scope of the claimed subject matter.

In one or more embodiments, a system for managing points of interest (POIs) is provided. A POI is imaged by capturing an image of the POI. Specifically, the system may be employed in a vehicle having a camera capable of capturing images of the environment the vehicle. The system enables the user to save or delete images captured by the vehicle without having to deviate his gaze from the road or using a mobile device. Instead, the user is able to save the images using a physical act, such as a facial movement, vocalization, or gesture. Accordingly, the user is able to save or delete images without risking the safety of the user himself, driver, occupant(s), or people and/or property near the vehicle.

In one embodiment, a heads up display (HUD) is employed in the vehicle such that a user may view images captured by a camera of a vehicle without averting his gaze from the location in front of him. The user may also save or delete a displayed image using a physical act. For example, the user may swipe his right hand from left to right. A sensor component detects user's behavior and identifies the physical act as an indication that the user desires the image be subject to an action, such as being saved or deleted.

Further, in one or more embodiments, control may be provided to a user, driver, or operator of the vehicle such that he or she may engage in capturing images of POIs and managing those images without stopping the vehicle or using a secondary mobile device. For example, the sensor component of the vehicle may enable an operator to perform a first physical act to capture and image of POI the vehicle is passing and perform a second physical act to save that image. Accordingly, the user may choose to perform multiple actions by performing multiple physical gestures corresponding to those actions. In one embodiment, when the user chooses to save an image, the image may be saved with additional information such as location at which the image was captured. In this way, managing images and data associated with a POI may be performed in an efficient and safe manner without impairing the user's ability to operate the vehicle.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
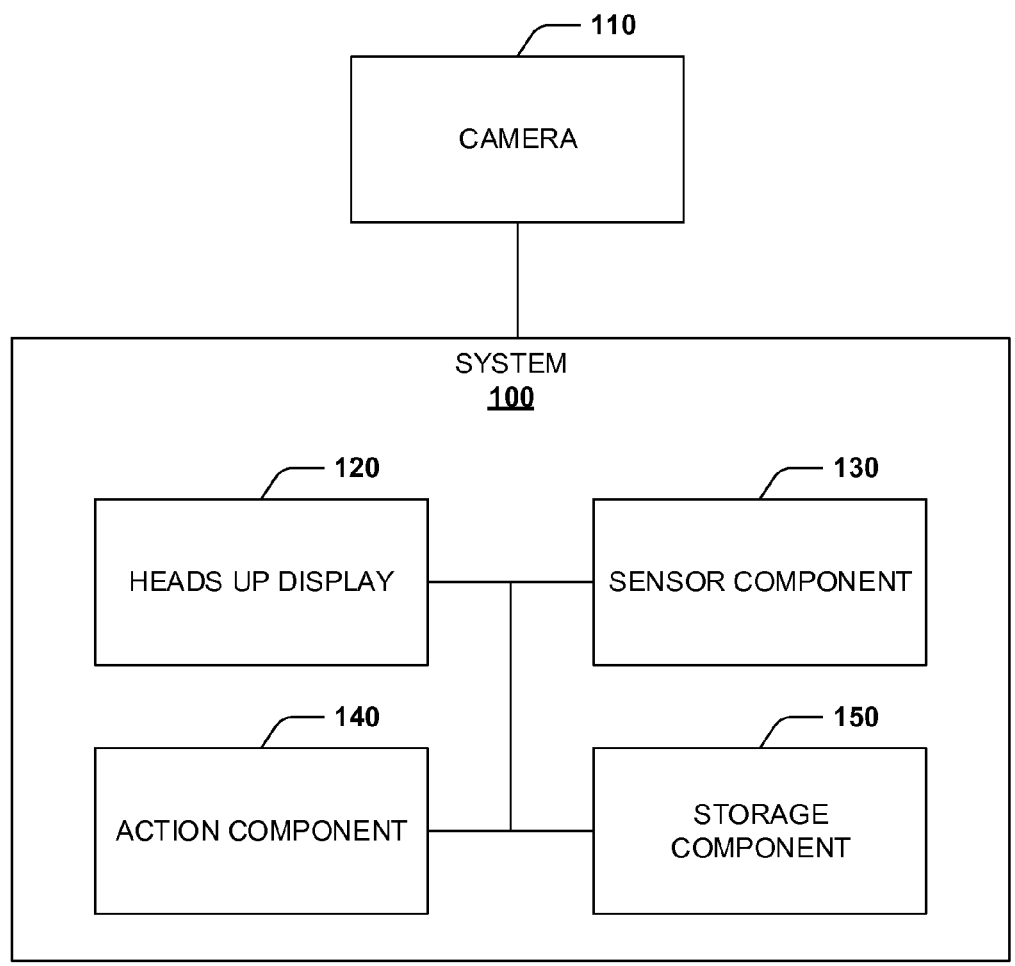
FIG. 1 is an illustration of an example component diagram of a system for managing points of interest, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

FIG. 1 is an illustration of an example component diagram of a system 100 for managing points of interest (POIs) and/or locations, according to one or more embodiments. Herein, the terms point of interest and location may be used interchangeably. Alternatively, a location may also be defined as a point of interest. In one embodiment, the system 100 is integrated with a vehicle having a camera 110. The camera 110 may be a digital camera, video camera, virtual camera, 3D camera, range camera, and so on. In one embodiment, the camera 110 may be a dual purpose camera. For example, the camera 110 may make use of a backup camera or dashboard camera.

The camera 110 is situated in the vehicle such that it captures images of the environment surrounding the vehicle.

For example, the camera 110 may be able to take pictures of POIs including businesses, homes, signs, building façades, intersections, and so on. The storefront 115 is shown as an example of an image that the camera may capture. In one embodiment, the camera 110 is an image capture device with a field of view of that mimics the user's own field of view. For example, the camera 110 may be mounted on the rear view mirror directed out of the vehicle. The camera 110 may capture images in response to a physical act, at a predetermined interval, continuously, etc. Accordingly, the vehicle has the integrated capability of imaging POIs using the camera 110.

The system 100 is operably connected to the camera 110. For example, the system 100 may be wirelessly connected to the camera 110. The system 100 may also be integrated as a content item of the vehicle. For example, the system 100 may be an element of an in-vehicle application. Alternatively, the system 100 may be integrated with a hands free application powered by a mobile device. The system 100 may include a Heads Up Display (HUD) 120, a sensor component 130, an action component 140, and a storage component 150.

The camera 110 may capture an image of a POI that a user is driving past in the vehicle. As used herein, the term "user" may include a driver of a vehicle, an operator of a vehicle, a passenger of a vehicle, an occupant of a vehicle, an entity, etc. In one embodiment, the captured image is displayed on the HUD 120. In another embodiment, the captured image from the camera is correlated with an image of the POI. For example, the captured image may be correlated with an existing image from a plurality of images stored of different POIs. The HUD 120 is a transparent display that allows the user to see through the display to the exterior of the vehicle. For example, the captured image is displayed by the HUD 120 such that the user is able to see through the windshield. The user may view the captured image without having to avert their gaze from the environment (e.g., road, terrain, track, parking lot, etc.).

In response to viewing a captured image on the HUD 120, the user may perform actions, such as saving or deleting the captured image using a physical gesture. The sensor component 130 monitors the user's behavior for physical gestures. The physical gestures may include a variety of user actions such as verbal commands, gesture inputs (e.g., a swipe, a two-finger swipe, a pinch), and/or a facial movement. For example, the sensor component 130 may detect the user waving their finger in the exemplary manner shown in 135. The sensor component 130 may utilize imaging devices, facial recognition, gesture recognition, light sensors, microphones, audio sensors, and other equipment to facilitate detecting physical gestures.

The sensor component 130 is positioned in the vehicle such that the physical movements and vocalizations of the user may be detected. For example, the sensor component 130 may be mounted in a rear view mirror of the vehicle pointing in the direction of the user. In one embodiment, the captured image may be saved. The user may perform the physical gesture that indicates a "save" action is to be performed. For example, the physical gesture of a "save" action may be a hand swipe. The sensor component 130 detects the movements of the user to identify that the user has performed a swipe. For example, the sensor component 130 may include motion detection components.

The action component 140 correlates the identified physical gesture with the action to be performed. For example, the action component 140 may include a database linking physical gestures with actions. In another embodiment, the action component 140 may attempt to infer a desired action from the physical gesture. The action component 140 then manages the captured image by causing the action to be performed on the captured image.

For example, as discussed in the example above, consider that the user performs a hand swipe to indicate that the user wishes to save the captured image. Once the action component 140 determines that the hand swipe is indicative of a save action, the action component 140 causes the captured image to be stored in the storage component 150. Thereby, satisfying the save action. In this manner, the action component 140 is able to interface with and utilize other components in order to complete the action associated with the physical gesture.

Accordingly, in the embodiment described the user is able to manage captured images without averting their eyes from their environment. Thus, the user is able save, delete, file, and so on the captured images while safely operating the vehicle. Later, when the user is able to focus on the captured images, the user may review the saved images. Since the captured images are of the POIs, the user is able to manage information about the POIs, such as the captured image. Accordingly, in one embodiment, the user is able to virtually save the POIs by saving the captured images.

Figure 2:
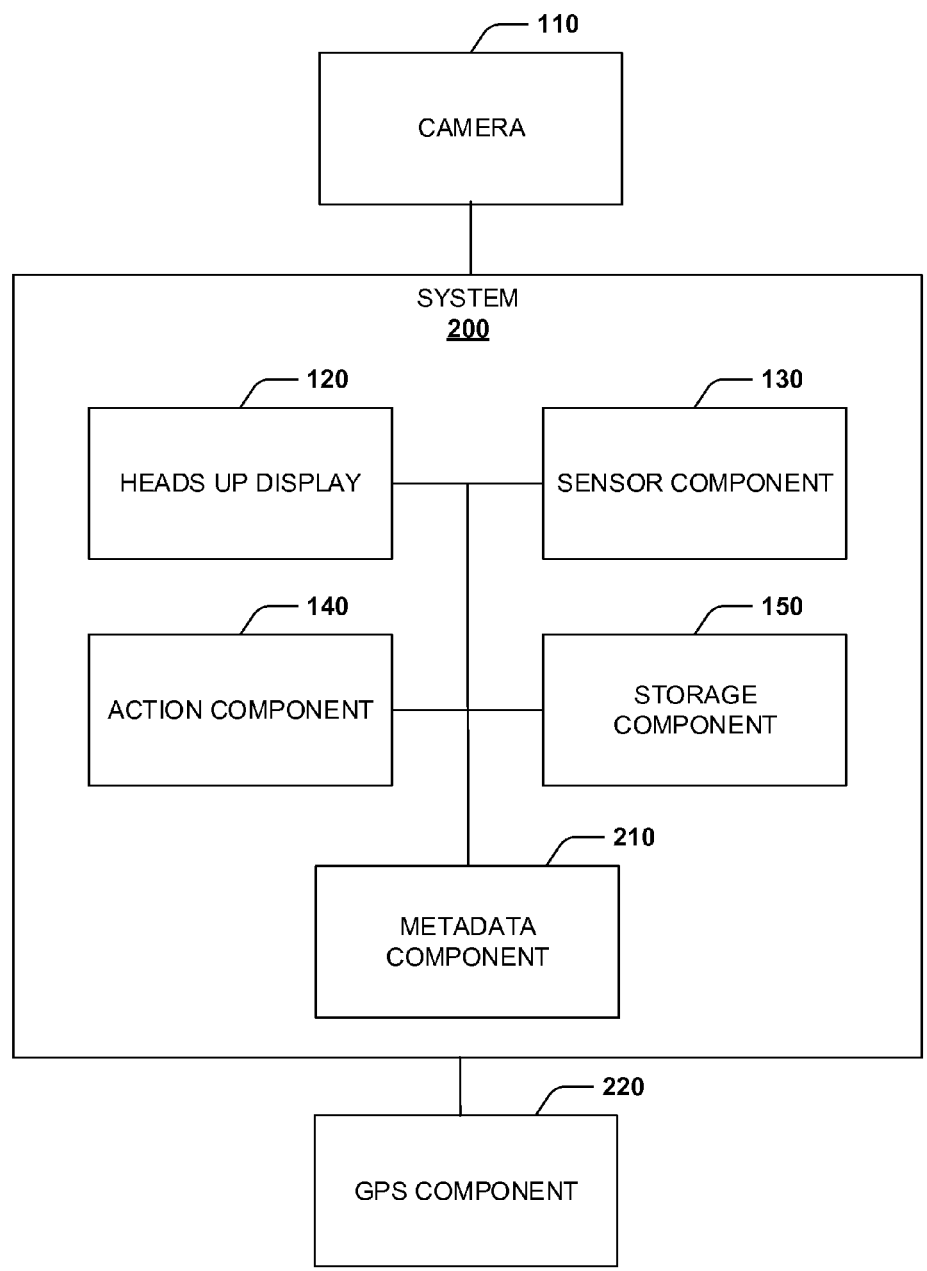
FIG. 2 is an illustration of an example component diagram of a system for managing points of interest having a metadata component, according to one or more embodiments.

FIG. 2 is an illustration of an example component diagram of a system for managing points of interest, according to one or more embodiments. The system 200 includes the HUD 120, the sensor component 130, the action component 140, and the storage component 150, which operate in a similar manner as described above with respect to FIG. 1. The system 200 also includes a metadata component 210. The metadata component 210 may be linked to a Global Positioning System (GPS) component 220.

A user may wish to save metadata with the captured image. The metadata may include time, date, weather conditions, traffic conditions, location data, information associated with the location (e.g., business registered to the location data, telephone number associated with the location, and so on) etc. In one example, the user may wish to append specific metadata to captured images. The metadata component 210 may automatically add the specified metadata. The metadata component 210 may append the metadata when a particular action is taken. For example, the metadata component 210 may only append metadata to captured images when the captured image is being saved. Alternatively, the user may perform an additional physical gesture to indicate that metadata is to be appended to the captured image.

The metadata component 210 may store metadata. For example, the metadata component 210 may store time and date information. Additionally or alternatively, the metadata component 210 may receive metadata from other components communicatively coupled to the system 200. For example, the user may wish to save the physical location of the POI appearing a captured image. The metadata component 210 may retrieve location data from the GPS component 220 integrated with the vehicle.

In one embodiment, the metadata component 210 receives and assembles a metadata packet. For example, as discussed above, the metadata component 210 may receive location data (e.g., address, coordinates, relative location, etc.) from the GPS component 220. The metadata component 210 may receive weather condition information from web-enabled devices, apps linked to the vehicle, etc. Finally, the metadata component 210 may receive date and time information from an operating system running applications associated with the vehicle. In one embodiment, the metadata component 210 assembles location data, weather condition information, and time and date information into a metadata packet.

In one embodiment, the metadata component 210 appends the metadata or metadata packet by associating the captured image with the metadata. In another embodiment, the metadata component 210 appends the metadata or metadata packet by electronically attaching the metadata or metadata packet to the captured image. In another embodiment, the metadata or metadata packet may be stored separately from the captured image. Instead, the captured image may be linked to the metadata or metadata packet. Accordingly, the user has the ability to store additional information with the captured image, such that the user is able to access the additional information when it is convenient.

Figure 3:
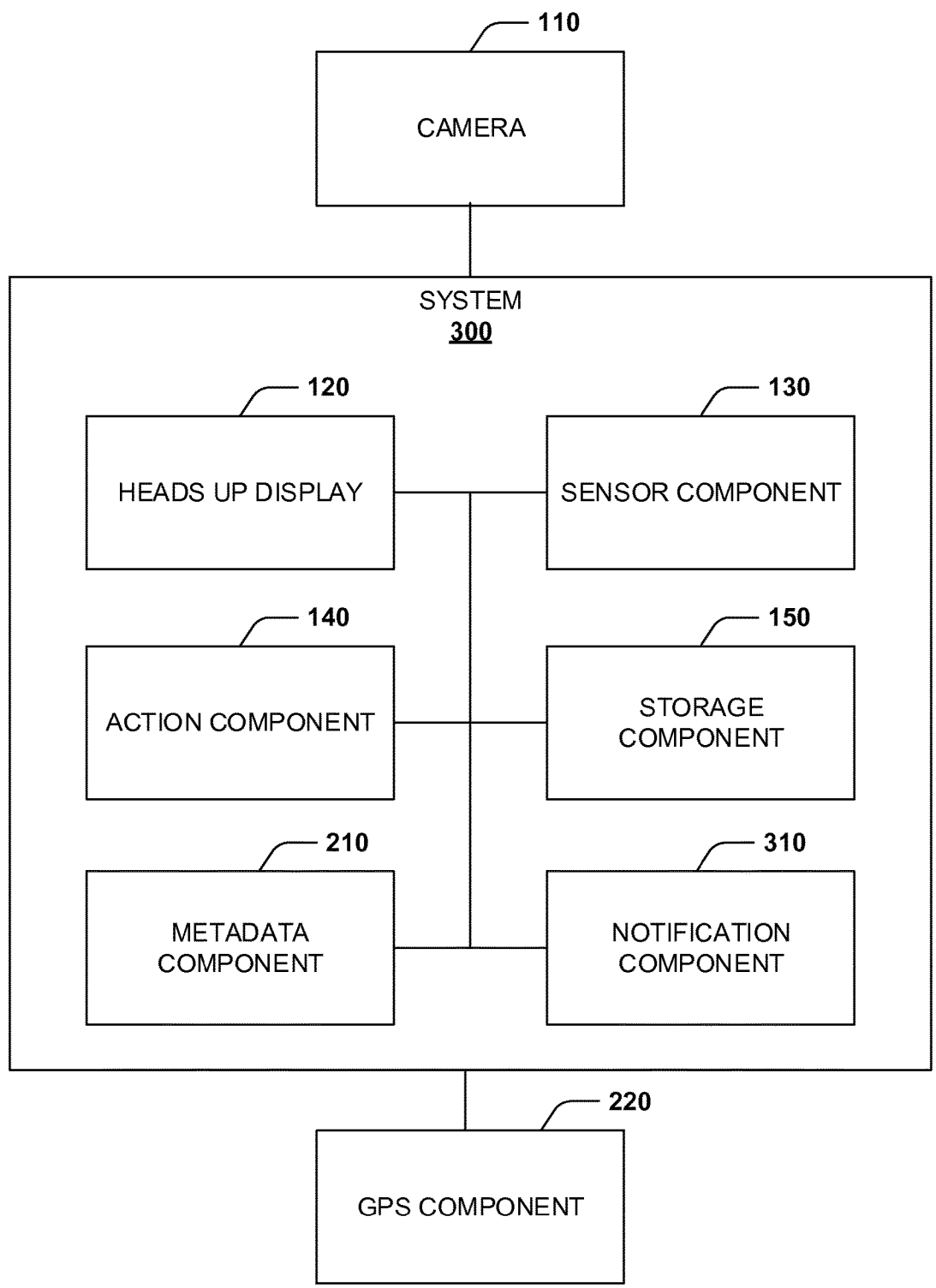
FIG. 3 is an illustration of an example component diagram of a system for managing points of interest having a notification component, according to one or more embodiments.

FIG. 3 is an illustration of an example component diagram of a system for managing points of interest having a notification component, according to one or more embodiments. The system 300 includes the HUD 120, the sensor component 130, the action component 140, and the storage component 150, which operate in a similar manner as described above with respect to FIG. 1. The system 200 includes the metadata component 210 described above with respect to FIG. 2. The system 300 also includes a notification component 310.

A user may wish to be notified when passing a POI. In one embodiment, the user chooses to save a captured image due to the POI appearing in the captured image. In response to the user saving the captured image, the notification component 310 sets an alert. The alert is triggered when the current vehicle data matches the metadata associated with the captured image. Thus, the user may be notified when the user subsequently passes by the POI. For example, as discussed above, the metadata may include location data. When the vehicle returns to the location identified in the location data, the alert is triggered.

In one embodiment, the notification component 310 determines that the metadata matches the current vehicle data by comparing the metadata to the current vehicle data received from one or more linked components. In the example given above, the user may wish to receive a notification when the vehicle returns to a specific POI. The location data appended to the captured image for that POI may be compared to the vehicles current location by accessing the GPS component 220. The notification component 310 triggers the alert based, at least in part, on a determination that the metadata matches the current vehicle data.

In one embodiment, the HUD 120 may display a visual notification in response to the alert being triggered. The visual notification may include the captured image associated with the POI being displayed on the HUD 120. The visual notification maybe an icon representing POIs generally or the specific POI being displayed on the HUD 120. Additionally or alternatively, the visual notification may be textual and displayed on the HUD 120. In one embodiment, the user is able to dismiss the notification using a physical gesture. For example, the user snapping his fingers may be the physical gesture to dismiss a notification. Accordingly, when the sensor component 130 monitors the user snapping his fingers, the visual notification is removed from the HUD 120.

In another embodiment, the alert being triggered may result in an audio notification. In one embodiment, the audio notification may be an alarm. Alternatively, the audio notification may be a computer generated spoken alert. For example, when passing a POI, the name of the POI may be spoken with a general direction. For example, when passing a POI of a restaurant, the audio notification may be "Restaurant, on the right." In another embodiment, a visual notification and audio notification may be used in combination in response to the alert being triggered.

Figure 4:
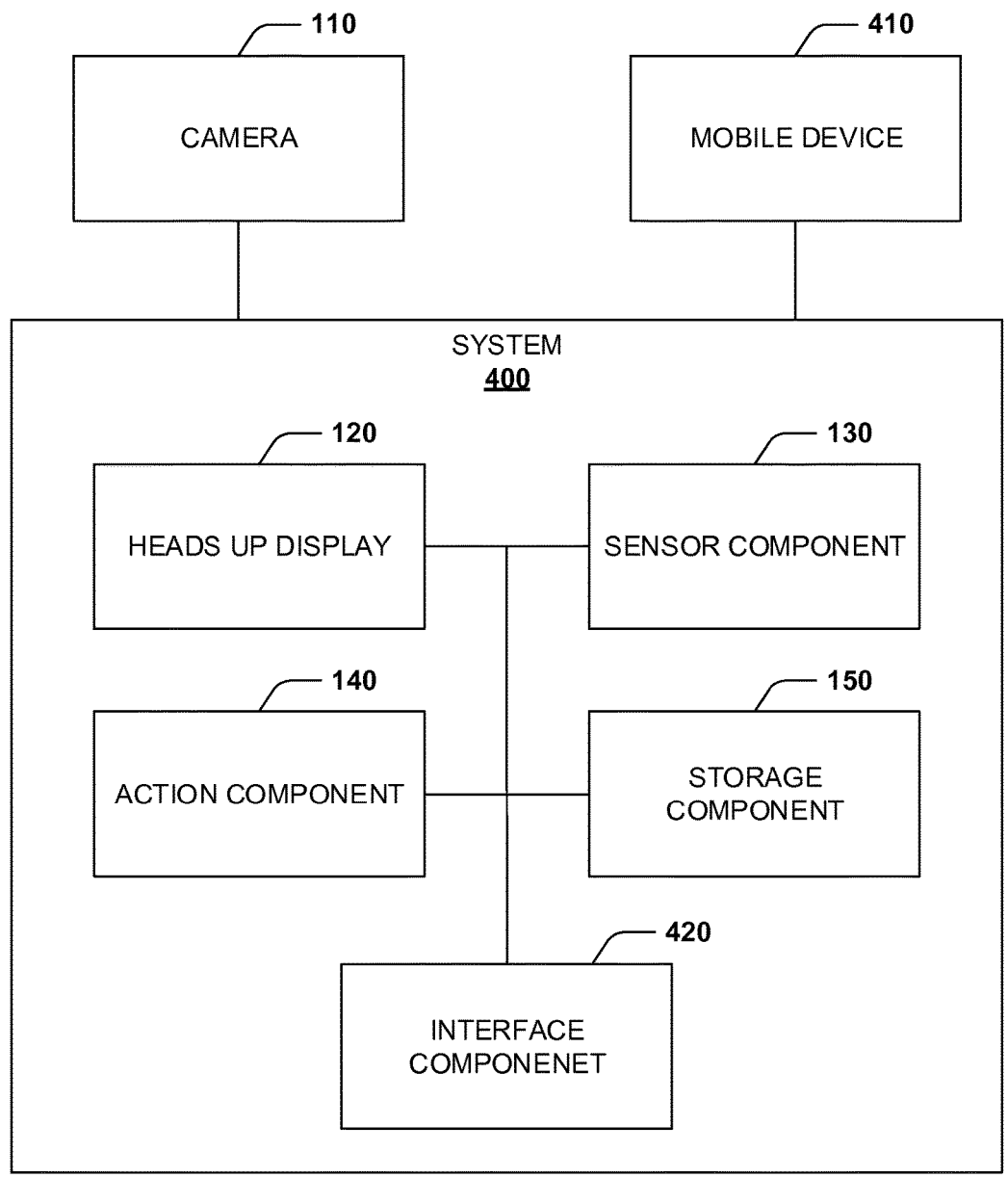
FIG. 4 is an illustration of an example component diagram of a system for managing points of interest associated with a mobile device, according to one or more embodiments.

FIG. 4 is an illustration of an example component diagram of a system for managing points of interest associated with a mobile device, according to one or more embodiments. In the embodiment illustrated, the system 400 is associated with a mobile device 410. The system 400 includes the HUD 120, the sensor component 130, the action component 140, and the storage component 150, which operate in a similar manner as described above with respect to FIG. 1. The system 400 also includes an interface component 420 for interfacing with the mobile device 410.

Embodiments described herein allow the user to review saved POIs without interfering with his driving experience. Accordingly, the user may wish to review saved images outside of the vehicle. For example, the user may wish to review the saved images associated with the POIs in his home. The interface component 420 may access the storage component 150 and send the stored images to the mobile device 410. The mobile device 410 may be a tablet, laptop, smart phone, personal digital assistant (PDA), wearable device, enterprise digital assistant, and so on. The user is able to review the POIs on the mobile device 410.

In another embodiment, the interface component 420 may be an application programming interface (API) having routines, protocols, and tools for allowing applications on the mobile device 410 to access information stored in the system 400. For example, the user may have an application on his mobile device 410 that may access the system 400 using the interface component 420.

Figure 5:
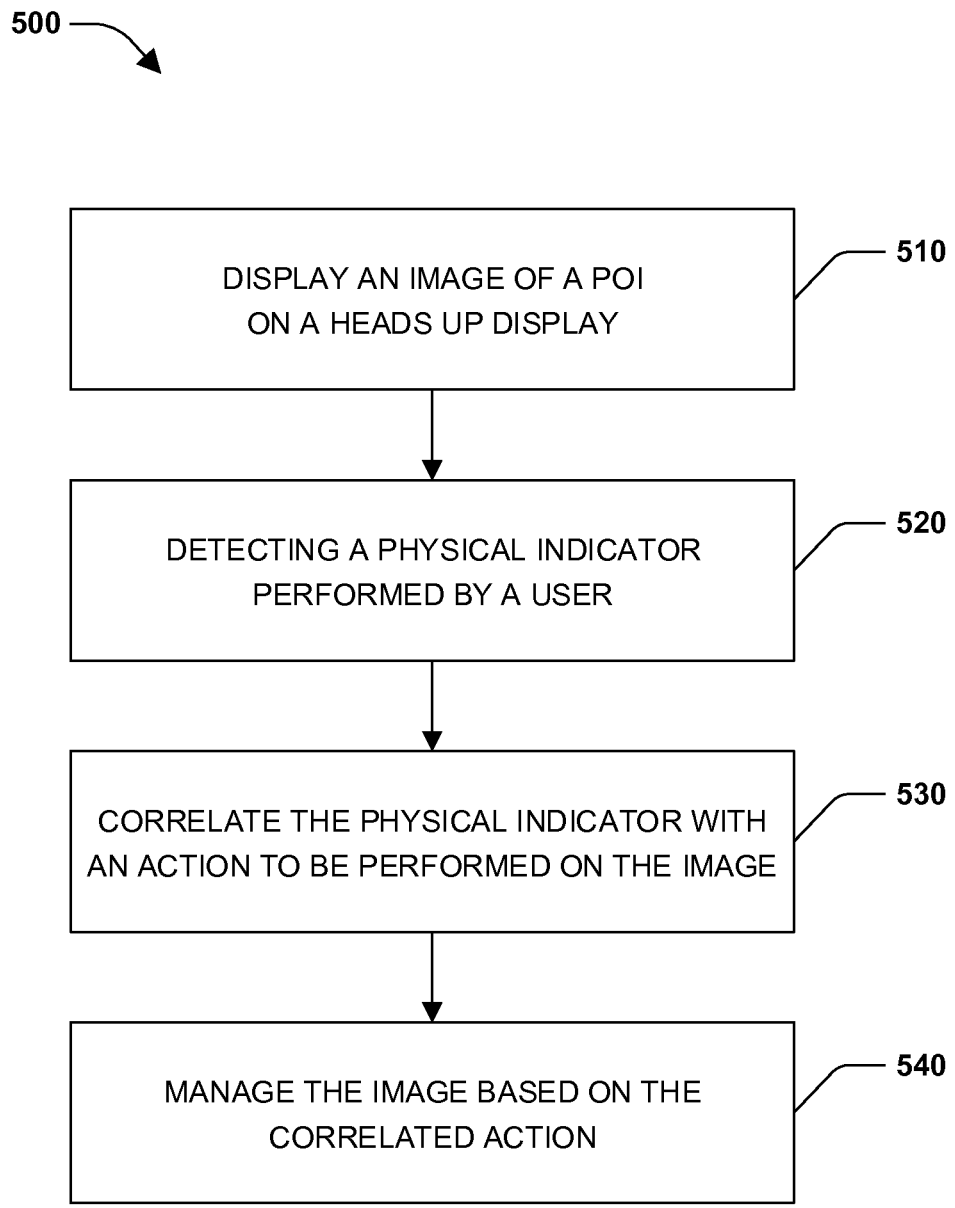
FIG. 5 is an illustration of an example flow diagram of a method for managing points of interest, according to one or more embodiments.

FIG. 5 is an illustration of an example flow diagram of a method for managing points of interest, according to one or more embodiments. At 510, an image is displayed on a Heads Up Display (HUD). At 520, the user is monitored in response to the image being displayed on the HUD. For example, a physical gesture may be a gesture, such as a swiping motion with the user's hand.

At 530, the physical gesture is correlated with an action to be performed on the image. The action gives the user the ability to manage the image. For example, the action may cause the image to be saved, deleted, filed, etc. At 540, the image is managed in the manner indicated by the action. For example, the image may be saved in a storage component.

Figure 6:
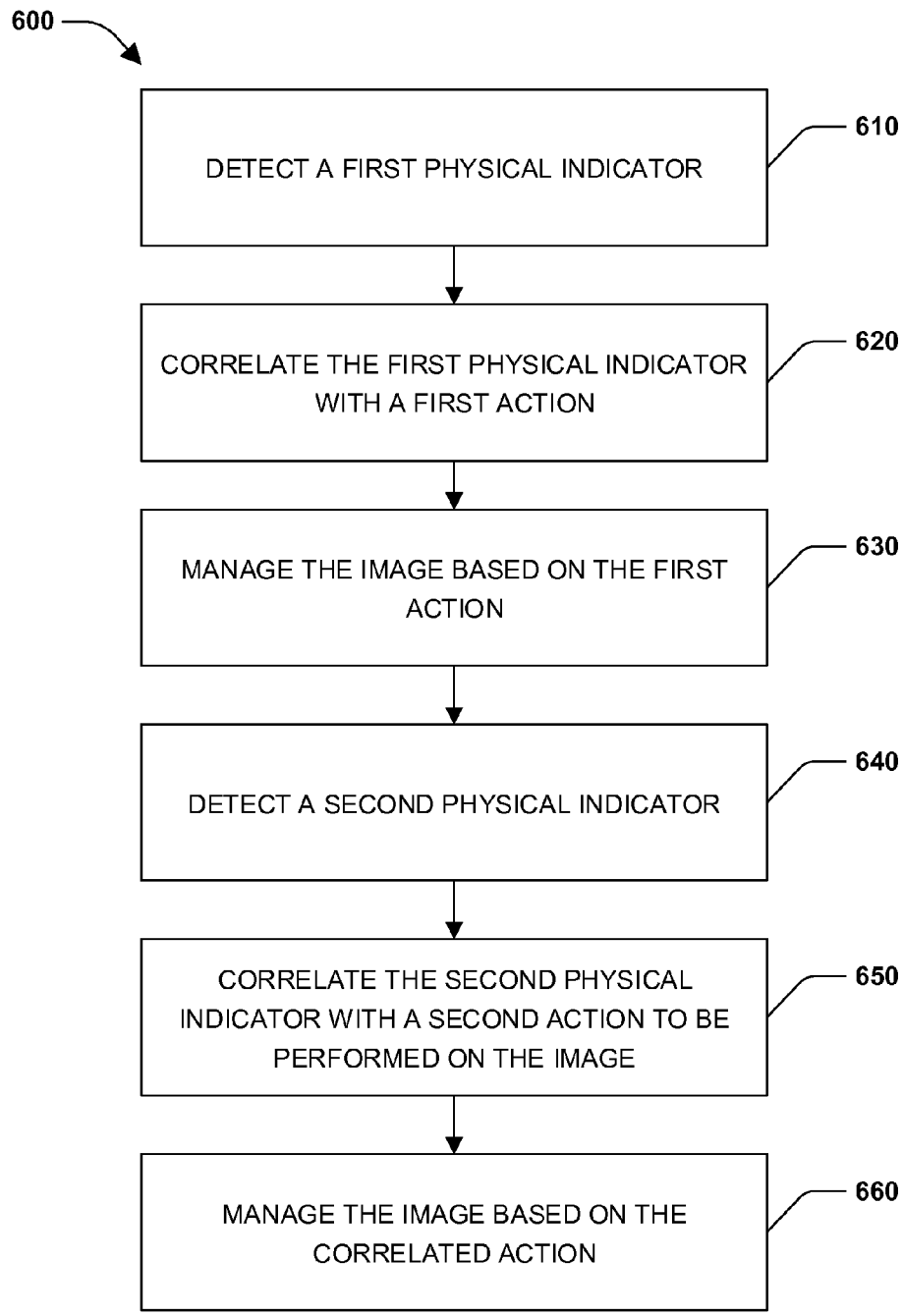
FIG. 6 is an illustration of an example flow diagram of a method for managing points of interest using multiple physical gestures, according to one or more embodiments.

FIG. 6 is an illustration of an example flow diagram of a method for managing points of interest using multiple physical gestures, according to one or more embodiments. At 610, a first physical gesture is detected. At 620, the first physical gesture is correlated with a first action. For example, the first physical gesture may be the user using his finger to point at a POI. At 630, the image is managed based on the first action. The first action may specify that the camera capture an image. Accordingly, the image would be captured. An action may include more than one operation. For example, an image may be both captured and displayed on a HUD in response to a single physical gesture.

At 640, a second physical gesture is detected. At 650, the second physical gesture is correlated with a second action. The first and second physical gesture may be the same physical gesture. Both the first and second physical gesture may be the same gesture (i.e., pointing). In this embodiment, using the same gesture as both the first and second physical gesture may specify a particular second action. In another embodiment, the first physical gesture may be different from the second physical gesture. For example, the first physical gesture may be a pointing gesture, but the second physical gesture may be a vocalization. At 660, the image is managed in the manner indicated by the second action. For example, suppose that the action specifies that the image be saved. Then the image would be saved in a storage component.

Figure 7:
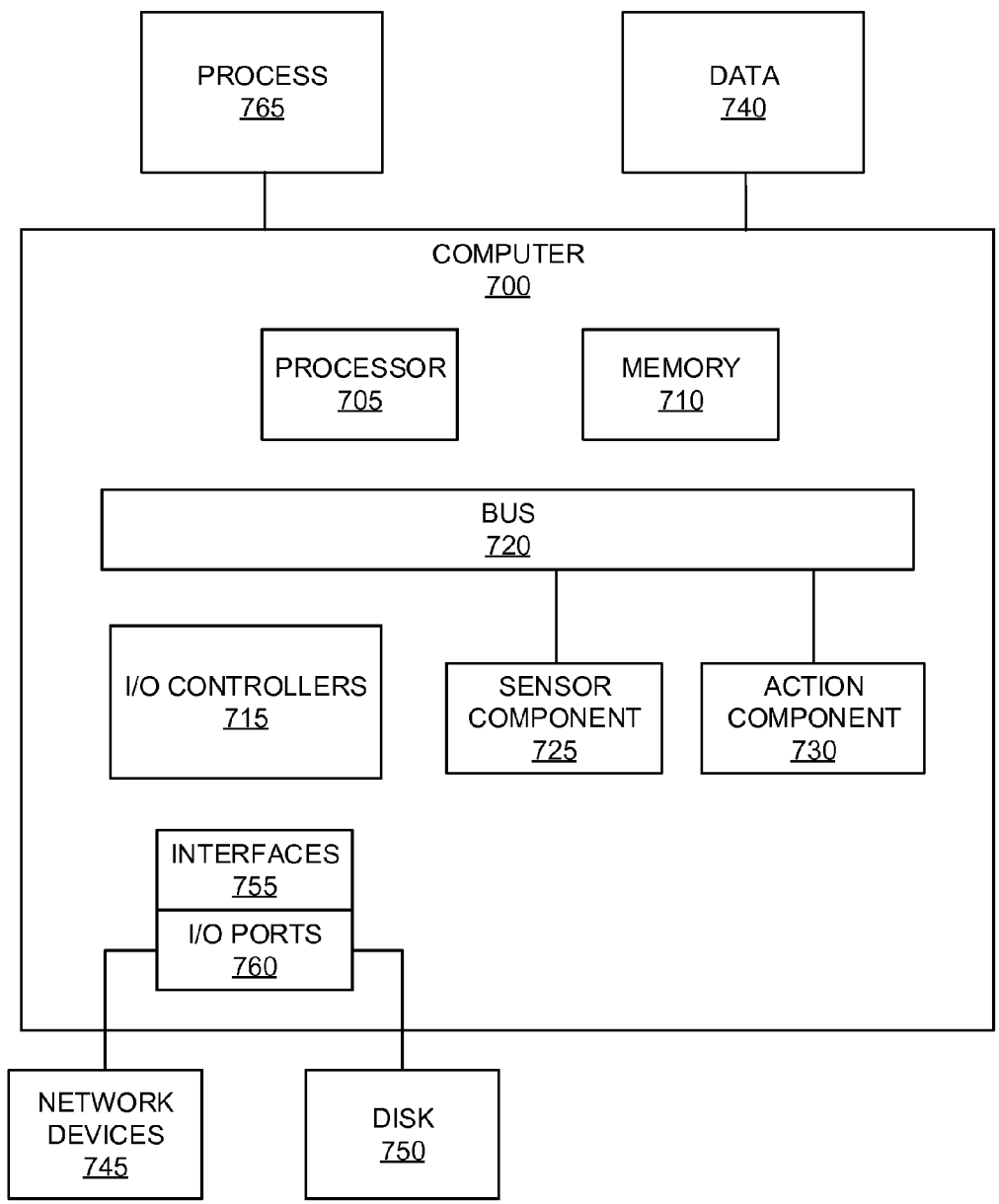
FIG. 7 is an illustration of an example computer environment associated with managing points of interest according to one aspect of the present disclosure.

FIG. 7 illustrates one embodiment of an example computer environment associated with identifying charging station users. The computer environment in which the systems and methods described herein, and equivalents, may operate may include a computer 700. The computer includes a processor 705, a memory 710, and input/output (I/O) ports 715 operably connected by a bus 720. In one example, the computer 700 may include a sensor component 725 and an action component 730.

The sensor component 725 monitors the user's behavior to detect physical gestures. Thus, the sensor component 130 may utilize imaging devices, facial recognition, gesture recognition, light sensors, microphones, audio sensors, and other equipment to facilitate monitoring the user's behavior for physical gestures. The action component 730 correlates the physical gesture to an action to be performed. In one embodiment, the action component 730 includes a mapping of physical gestures to actions. For example, a swiping gesture with the user's hand may be a physical gesture. The action component 730 determines the swiping gesture is mapped to a saving action that causes a POI to be saved by saving the image associated with the POI. The action component 730 may then cause the POI to be saved. For example, the action component may save the image in a storage component such as the memory 710

In different examples, the sensor component 725 and the action component 730 may be implemented in hardware, a non-transitory computer-readable medium with stored instructions, firmware, and/or combinations thereof. While the sensor component 725 and the action component 730 are illustrated as hardware components attached to the bus 720, it is to be appreciated that in one example, sensor component 725 and the action component 730 could be implemented in the processor 705.

In one embodiment, the sensor component 725 is a means (e.g., hardware, non-transitory computer-readable medium, firmware) for detecting the physical behavior of a user so that the sensor component may detect when the user has performed a physical gesture. Accordingly, as discussed above, the sensor component may include a means for imaging, facial recognition, gesture recognition, light sensing, audio sensing, and other equipment to facilitate monitoring the user's behavior for physical gestures.

The action component 730 is a means correlating a physical gesture to actions. For example, the action component 730 may include a database, table, mapping engine and so on for associating physical gestures to action. The action component 730 is also a means for performing the action. In one embodiment, the action component 730 includes the means for managing data such as images associated with the POIs and associated metadata.

Generally describing an example configuration of the computer 700, the processor 705 may be a variety of various processors including dual microprocessor and other multi-processor architectures. The memory 710 may include volatile memory and/or non-volatile memory. Non-volatile memory may include, for example, ROM, PROM, and so on. Volatile memory may include, for example, RAM, SRAM, DRAM, and so on.

Network device 745 and a disk 750 may be operably connected to the computer 700 via, for example, an I/O interfaces (e.g., card, device) 755 and an I/O ports 760. The disk 745 may be, for example, a magnetic disk drive, a solid state disk drive, a floppy disk drive, a tape drive, a Zip drive, a flash memory card, a memory stick, and so on. Furthermore, the disk 745 may be a CD-ROM drive, a CD-R drive, a CD-RW drive, a DVD ROM, and so on. The memory 710 may store data 740 and/or a process 765, for example. The disk 750 and/or the memory 710 may store an operating system that controls and allocates resources of the computer 700.

The bus 720 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 720 may be types including, for example, a memory bus, a memory controller, a peripheral bus, an external bus, a crossbar switch, and/or a local bus.

The computer 700 may interact with I/O devices via the I/O interfaces 755 and the I/O ports 760. Input/output devices may be, for example, a keyboard, a microphone, a pointing and selection device, cameras, video cards, displays, the network devices 745, the disk 750, and so on. The I/O ports 760 may include, for example, serial ports, parallel ports, and USB ports.

The computer 700 may operate in a network environment and thus may be connected to the network devices 745 via the I/O interfaces 755, and/or the I/O ports 760. Through the network devices 745, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and may be, for example, a network transfer, a file transfer, an applet transfer, an email, an HTTP transfer, and so on. A computer communication may occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that may store instructions and/or data. Computer storage medium described herein are limited to statutory subject matter under 35 U.S.C § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities may be operably connected to communicate signals to each other directly or through one or more intermediate entities (e.g., processor, operating system, logic, software). Logical and/or physical communication channels may be used to create an operable connection.

While for purposes of simplicity of explanation, illustrated methodologies are shown and described as a series of blocks. The methodologies are not limited by the order of the blocks as some blocks may occur in different orders and/or concurrently with other blocks from that shown and described. Moreover, less than all the illustrated blocks may be used to implement an example methodology. Blocks may be combined or separated into multiple components. Furthermore, additional and/or alternative methodologies may employ additional, not illustrated blocks. The methods described herein is limited to statutory subject matter under 35 U.S.C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for managing a location, comprising:
   a heads up display (HUD) correlating an image associated with the location with a captured image captured by a camera of a vehicle;
   a sensor component detecting a physical gesture performed by a user;
   an action component correlating the physical gesture with the image and saving the image to a storage component;
   a metadata component appending metadata to the image when the captured image is being saved, wherein the metadata component receives location metadata from a Global Positioning System (GPS) component in the vehicle and appends the location metadata to the image; and
   a notification component subsequently comparing the location metadata appended to the image to current vehicle data, determining that the metadata matches the current vehicle data, and in response to the matching determination, triggering an alert, wherein the alert is a visual notification including the image.

2. The system for managing the location of claim 1, wherein the physical gesture is a hand motion.

3. The system for managing the location of claim 1, wherein the location is a point of interest.

4. The system for managing the location of claim 1, wherein the metadata component aggregates metadata from multiple components into a metadata packet and appends the metadata packet to the image.

5. The system for managing the location of claim 1, wherein the alert is a visual notification displayed on the HUD.

6. A method for managing a location, comprising:
   displaying an image of the location on a heads up display (HUD);
   detecting a physical gesture performed by a user;
   correlating the physical gesture with an action to be performed on the image;
   managing the image based on the correlated action, wherein the action includes saving the image to a storage component;
   appending metadata to the image when the captured image is being saved, wherein the metadata includes location metadata received from a Global Positioning System (GPS) component in the vehicle;

comparing the location metadata appended to the image to current vehicle data;
determining that the metadata matches the current vehicle data; and
triggering an alert in response to the matching determination, wherein the alert is a visual notification including the image.

7. The method for managing the location of claim 6, wherein the physical gesture is a hand motion.

8. A method for managing a point of interest (POI), comprising:
   detecting a first physical gesture performed by a user in a vehicle;
   correlating the first physical gesture with a first action to be performed on an image;
   managing the image based on the first action, wherein the first action is capturing an image using a camera of the vehicle;
   detecting a second physical gesture performed by the user;
   correlating the second physical gesture with a second action to be performed on the image;
   managing the image based on the second action, wherein the second action includes saving the image to a storage component;
   appending metadata to the image when the captured image is being saved, wherein the metadata includes location metadata received from a Global Positioning System (GPS) component in the vehicle;
   comparing the location metadata associated with the image to current vehicle data;
   determining that the metadata matches the current vehicle data; and
   triggering an alert in response to the matching determination, wherein the alert is a visual notification including the image.

9. The method for managing the POI of claim 8, wherein managing the image based on the first action and the second action includes displaying the image on a heads up display.

* * * * *